(12) United States Patent
Feuerstein et al.

(10) Patent No.: US 6,246,674 B1
(45) Date of Patent: *Jun. 12, 2001

(54) ANTENNA DEPLOYMENT SECTOR CELL SHAPING SYSTEM AND METHOD

(75) Inventors: Martin J. Feuerstein, Redmond; Mark Reudink, Issaquah; Douglas O. Reudink, Bellevue, all of WA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/924,285

(22) Filed: Sep. 5, 1997

Related U.S. Application Data

(63) Continuation-in-part of application No. 08/786,725, filed on Jan. 27, 1997, now Pat. No. 5,889,494.

(51) Int. Cl.⁷ ...................................................... H04R 7/00
(52) U.S. Cl. ............................................ 370/334; 455/443
(58) Field of Search .................................... 370/331, 334, 370/335, 342, 480, 482; 455/438, 443, 444

(56) References Cited

U.S. PATENT DOCUMENTS

| | | | |
|---|---|---|---|
| 5,347,288 | * 9/1994 | Page | 342/375 |
| 5,565,873 | 10/1996 | Dean | 342/372 |
| 5,771,017 | * 6/1998 | Dean et al. | 342/374 |
| 5,861,844 | * 1/1999 | Gilmore et al. | 342/374 |
| 5,889,494 | * 3/1999 | Reudink et al. | 342/373 |

FOREIGN PATENT DOCUMENTS

| | | | |
|---|---|---|---|
| 0639035 A1 | 2/1995 | (EP) | H04Q/7/36 |
| 0725498 A1 | 8/1996 | (EP) | H04B/7/36 |
| 0777400 A2 | 6/1997 | (EP) | H04Q/7/36 |

* cited by examiner

Primary Examiner—Joe H. Cheng
Assistant Examiner—Kim T. Nguyen
(74) Attorney, Agent, or Firm—Fulbright & Jaworski L.L.P.

(57) ABSTRACT

A system and method are disclosed for dynamically sizing sectors of a multi-sectored radiation pattern. The disclosed invention teaches the use of multiple narrow beams composited to form a radiation pattern. Signals associated with each such narrow beam may be provided to inputs of a scan receiver or signaling radio which inputs are associated with a particular sector of the radiation pattern. The number of narrow beam signals provided inputs associated with a particular sector defines the azimuthal width of that sector. By altering the number of narrow beam signals provided each such input, the azimuthal width of the sectors may be adjusted. The disclosed invention also teaches the use of attenuators in the signal path between the narrow beams and the scan receiver or signalling radio. By adjusting these attenuators, the effective length of the sectors may be adjusted.

67 Claims, 7 Drawing Sheets

ANTENNA DEPLOYMENT SECTOR CELL SHAPING SYSTEM AND METHOD

The present application is a continuation-in-part of commonly assigned, U.S. patent application, Ser. No. 08/786,725, now U.S. Pat. No. 5,889,494, entitled "ANTENNA DEPLOYMENT SECTOR CELL SHAPING SYSTEM AND METHOD", filed Jan. 27, 1997. The present application is being concurrently filed with commonly assigned U.S. patent application, Ser. No. 08/924,741 entitled "EMBEDDED DIGITAL BEAM SWITCHING", the disclosure of which is incorporated herein by reference. Reference is also hereby made to the following and commonly assigned U.S. patent applications: APPARATUS, SYSTEMS AND METHODS FOR MULTIPLE ANTENNA TRANSMISSION IN WIRELESS COMMUNICATIONS SYSTEMS, Ser. No. 08/520,316, now U.S. Pat. No. 5,648,968; METHOD AND APPARATUS FOR IMPROVED CONTROL OVER CELLULAR SYSTEMS, Ser. No. 08/582,525, now U.S. Pat. No. 5,884,147; and SYSTEM AND METHOD FOR CELLULAR BEAM SPECTRUM MANAGEMENT, Ser. No. 08/651,981, now U.S. Pat. No. 5,745,841; the disclosures of which applications are incorporated herein by reference.

TECHNICAL FIELD OF THE INVENTION

This invention relates to cellular antennas and more particularly to a system and method for providing flexible sector shaping within a multiple sector cell, including both the ability to adjust the sector's length, as referenced in the direction of propagation of the radiation, as well as its width, as referenced azimuthally.

BACKGROUND OF THE INVENTION

As cellular communications become more widely used, the number of individual users and calls multiplies. Increase in cellular communications utilization magnifies the opportunity for interference between the different users on the cellular system. Such interference is inevitable because of the large number of users and the finite number of cellular communications cells and CDMA code channels which are available.

This invention applies to Code Division Multiple Access (CDMA) system, where the users would be separated from one another, either using different codes and/or different time delays of the same code, while utilizing the same frequency band. Because of this use of the same frequency band, there is a potential, as the system becomes loaded with a number users, of heavy traffic interference between one user and another limiting the capacity of the system. The comparable system for analog would have users separated on different frequencies with reuse of the same frequencies provided for with a guard distance or guard zone (reuse distance) between points in which the same frequencies are used again. There are certain problems that are inherent to CDMA networks including interference from one cell to another, since typically every cell reuses the same frequency. The forward link at any particular mobile's location may receive interference from a number of cells. Some of those would be desired cells that the mobile would be in handoff with. Others would be cells that the mobile could not be in handoff with, but that would interfere with the signal that the mobile was receiving. An analogous problem happens on the reverse link, where a cell site would receive signals from a number of mobiles, the desired mobiles that are within the coverage area of that sector, as well as mobiles that are being served by other cells, that interference would limit the capacity of a given sector.

To reduce the interference problems caused by other users in the omni cell 360° configuration, cells have been broken down into 120° sectors such that each channel available at the cell only communicates in an area of 120° radial coverage about the cell. An advantage, in addition to the reduction of interference realized by the sector system, is that such a cell achieves extended range as compared to an omni cell 360° system simply due to the ability to focus a greater signal gain on the antennas. Individual cells may then cover a larger area, and communications signals may be stronger within the cell.

It shall be appreciated that loading of sectors is often cyclic or dynamic in nature rather than constant. For example, during certain times of day, such as business commuting times, a particular sector, such as a sector encompassing an urban highway, may service more users than during other times of day. Therefore, during particular times a particular sector or sectors may require increased capacity in order to service all users whereas at other times the cell's capacity might be better utilized when spread more homogeneously throughout the cell's coverage area.

It would, therefore, be advantageous to make more efficient use of cellular capacity by being able to make sectors dynamically shapable in order to provide increased capacity to a particular area within the cell's radiation pattern by making more channels potentially available to that particular area. Ideally, the shapable sectors will be composed of narrow beams so as to provide a convenient means by which sectors may be sized radially about the cell. Systems implementing such narrow beams are described in U.S. Pat. No. 5,563,610, entitled "NARROW BEAM ANTENNA SYSTEM WITH ANGULAR DIVERSITY," incorporated herein by reference, and the associated above-referenced co-pending and commonly assigned continuation-in-part U.S. patent application entitled "APPARATUS, SYSTEMS AND METHODS FOR MULTIPLE ANTENNA TRANSMISSION IN WIRELESS COMMUNICATIONS SYSTEMS." Management of such a system, including concurrent beam and channel management within a neighborhood of cells, is disclosed in the above referenced co-pending and commonly assigned U.S. patent application entitled "METHOD AND APPARATUS FOR IMPROVED CONTROL OVER CELLULAR SYSTEMS."

Another problem in the art is that in a cellular system, communications are typically mobile, often in vehicles travelling at considerable speed. Such mobile communication devices tend to travel through the various sectors and/or cells of a cellular system, thereby continuously effecting signal quality as fringe or shadow areas are entered and exited. These effects of signal quality are not limited to the mobile communication device itself, but also effect other communication devices operating in the area. For example, a communication device operating in one cell, although experiencing acceptable signal quality itself, may in fact be causing interference for another communication device. Such interference may be in the form of frequency reuse interference, near/far problems, increased energy density and the like. Therefore, it is desirable to provide a means by which such a communication device may be handed off to another sector or cell, although its communication parameters do not necessitate the handoff, in order to better serve another communication device. Likewise, such a communication device may be experiencing communication of a quality so as to be within acceptable parameters although communication of a better quality may be had through an adjacent sector or cell.

One benefit or use of this changing of the sector size would be to load balance the traffic among the sectors of a cell or sectors of adjacent cells. A particular example would be a case where one sector was at a capacity limit, such as either running out of transmit power or being unable to support any additional users. Other sectors on that cell may have additional capacity to spare, by mapping sectors to beams in a more optimum way, could equalize the load across the sectors and alleviate the overload condition on the sector that previously had reached a capacity limit.

Recognizing the mobility of communications and the attendant communication quality issues, therefore, it would also be advantageous to be able to dynamically shape sectors in their longitudinal, or outboard, reach from a cell site. Preferably, as it is determined that a communication device is causing interference for another communication device or as it is determined that this communication device may itself be better served by another sector or cell, the shape of the sector currently serving the communication device may be adjusted to force a handoff of the communication device to another sector or cell. Likewise, where capacity remains in a sector of any adjacent cell, the sector at capacity could reduce its area of influence simultaneously with the adjacent sector increasing its area of influence, in order to provide additional capacity within the area originally serviced by the sector that previously had reached a capacity limit. Ideally, the longitudinal shape of sectors will be accomplished through the use of attenuators in the receive signal path and equivalent gain adjustments of transmit power in the transmit path.

A need therefore exists in the art for a system and method for dynamically adjusting the shape of cell sectors to provide for greater trunking efficiency and the ability to serve more users. Moreover, a need in the art exists for such a system to provide azimuthal as well as longitudinal shaping of the sectors.

SUMMARY OF THE INVENTION

The present invention uses a multiple narrow beam antenna system to provide dynamically shapable sectors within a cell. By dynamically shaping the various sectors of a cell, problems of interference, such as frequency reuse interference or interference due to decreased carrier to noise ratio and the like, as well as channel depletion within a sector that attend the 3-sector system in wide use today may be addressed. Furthermore, through the use of dynamic sector shaping, the present invention provides the technical advantage of both increasing the number of users in a particular area which may be serviced by a cell as well as decreasing the interference to other cells.

Although any number of beams may be used in accordance with the principles of the present invention, a preferred embodiment uses 12 such beams. In order to provide 360° coverage radially about the antenna system utilizing 12 beams, each beam is adapted to provide approximately 30° azimuthal coverage.

Dynamic assignment of beams to a particular sector within the cell results in the ability to adjust the sector's width, as referenced azimuthally. For example, assigning 2 of the aforementioned 30° beams to a sector provides a sector having a 60° radiation pattern. Likewise, assigning 6 of the aforementioned 30° beams to a sector provides a sector having a 180° radiation pattern.

By dynamically shaping sectors, the invention may open up the re-use of certain sectors during certain times of the day as utilization demands. Accordingly, in a CDMA system, energy associated with a particular CDMA code channel may be substantially isolated to particular sector in which an associated mobile is operating. Thus, energy may be reduced in other sectors allowing for the use of additional CDMA code channels in those sectors before the interference power level is such that a capacity limit is reached. Therefore, it will be appreciated that a technical advantage of the present invention is to provide for greater trunking efficiency and the ability to serve more users.

The dynamic assignment of beams to cell sectors of the present invention is accomplished through the use of a switch matrix, or other means by which a signal path may be discontinued, associated with each beam. Each such means may be adjusted to provide a signal from its associated beam to any input of a base transceiver station (BTS) demodulation receiver (demodulation Rx).

In a preferred embodiment of the present invention, attenuators are utilized to control signal amplitude as provided to inputs associated with the aforementioned demodulation Rx. Such attenuators may be included between the output of switch matrixes used to adjust signal paths and the inputs to the demodulation Rx, or may in fact replace the switch matrixes in providing the ability to discontinue the path of a particular signal to a particular input of the demodulation Rx.

Additionally, attenuators may be utilized to adjust the magnitude of the transmit signal to the mobile. Such adjusting results in the mobile receiving a lower power signal than would otherwise be transmitted, and this lower level signal is used to essentially fool the mobile into requesting a handoff to an adjacent sector or cell. Such artificially forced handing off of communications may be useful in providing capacity for another communication device in an otherwise full sector by handing off a communication device capable of communicating through an adjacent sector or cell. Similarly, the handing off may be useful in increasing signal quality by handing off a communication that, although the signal quality is within acceptable limits, is causing interference to another communication device or is itself experiencing poorer signal quality than would be available at an adjacent sector or cell.

Moreover, provision of the aforementioned attenuators results in a technical advantage in the ability to adjust the sector's effective outboard reach or length, as referenced in the direction of propagation of the radiation. It shall be appreciated that reduction of the size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers, thus a system of cells utilizing the present invention may be used to provide increased signal quality as well as increased capacity without increasing the number channels available at each cell.

One technical advantage of this approach specific to CDMA is realized due to the fact that the mobile receiver unit has a fixed finite number of demodulators, allowing it to communicate with a finite number of cells at a given time. In a deployed CDMA network there will generally be locations where a large number of cells on the forward link will have strong signals present at the mobile. In situations such as this, if the number of signals that are present at the mobile exceed the number of receiver modules that are built into the mobile, the mobile will experience interference from the sectors that it is not able to assign a demodulation receiver to. The shaping mechanism for the cell of the present invention would allow system operators to reduce the number of servers to a given mobile to match, or more nearly match, the number of demodulation receivers that are in the mobile, reducing the overall interference. Another technical advantage of the present invention is realized in how CDMA systems originate a call from a mobile to the land line side of the network or vice versa. The origination or access process generally takes place with the mobile communicating with one cell site, rather than multiple cell sites. In this situation, it is preferable to have one single dominant server, or one strong cell able to serve the mobile. The ability to shape the coverage of particular cells of the present invention allows service providers to have a higher probability of providing a dominant server at any given location to support these call originations.

A still further technical advantage of the present invention, that would apply both to analog and to CDMA digital systems, is the ability to target specific coverage areas, such as office buildings, sport stadiums, and the like, where large numbers of users are likely to be congregating. Targeting coverage could be done for particular periods of time and then reconfigured at other times. Another example of concentrating the coverage would be to adjust the beam to sector mapping such that the overall coverage of a cell was less than 360°. So as to provide all of the capacity for a given cell in some azimuth angle extent that was less than 360°, for example, a sport stadium or some other hot spot of traffic.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention provides a system and method for dynamically shaping sectors within a cell. Preferably, the shapable sectors will be composed of narrow beams so as to provide a convenient means by which sectors may be sized azimuthally. Such multiple beams may be provided by either a single multi-beam antenna or a plurality of co-located discrete antennas.

Figure 1A:
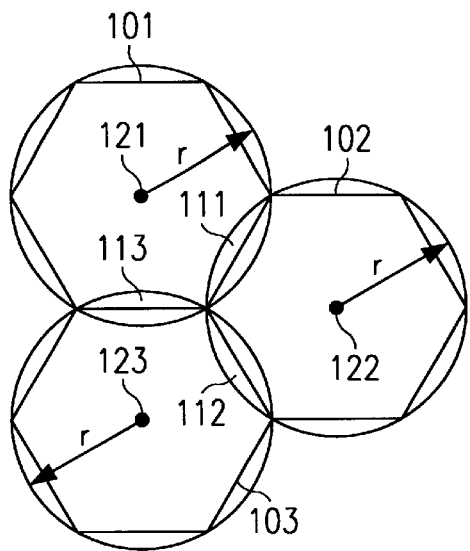
FIG. 1A illustrates a typical prior art omni-cell arrange.

To enable a better understanding of the advantages of the present invention, a brief description of some relevant prior art is included hereinafter. Directing attention to FIGURE 1A, a typical prior art cellular pattern is illustrated by communication arrays 121 through 123 disposed to communicate in predefined areas, or "cells," illustrated as cells 101 through 103. These cells are omni directional cell sites as the signal can be utilized in an entire 360° radius about the cell site.

As illustrated, a cell footprint is fixed by its forward channel radiated power, illustrated here as radius r. As can be seen by areas 111 through 113, there is some overlap between the radiation patterns of arrays 121 through 123 in order to provide the desired communication coverage within the cells.

The overlapping areas of communication coverage cause the potential for interference between communication devices operating within the cells. Therefore, interference, such as frequency re-use interference, is likely to be experienced when a communication device is operating within or near the area of overlap as the energy of the cell in which the mobile is communicating and that of the adjacent cell are combined as the interference power level.

Figure 1B:
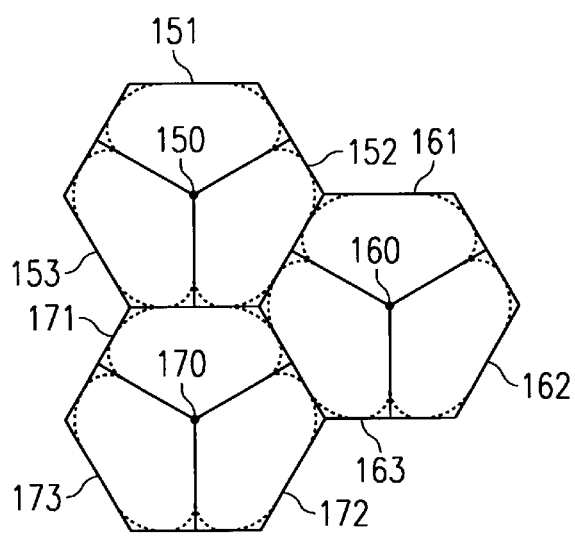
FIG. 1B illustrates a typical prior art sectored cell arrangement.

A prior art solution to this problem has been to implement a sectored cell arrangement as is illustrated in FIG. 1B. In this arrangement a single communication array provides communication in several defined sectors. For example, communications arrays 150, 160, and 170 are adapted to provide three discrete radiation patterns in predefined areas, or "sectors," illustrated as sectors 151 through 153, 161 through 163, and 171 through 173 respectively. The cells defined by this system are sector cell sites wherein the interference power level is distributed among the sectors.

Figure 2:
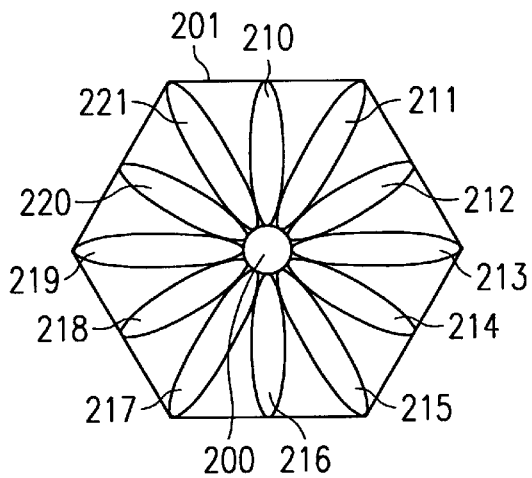
FIG. 2 illustrates a multi-beam cell utilized by the present invention.

Directing attention to FIG. 2, a multi-beam cell site utilized by the present invention is illustrated. Here 360° communication about cell site 200, and within cell 201, is accomplished by using multiple narrow beams illustrated as beams 210 through 221. Systems implementing such narrow beams are described in U.S. Pat. No. 5,563,610, entitled "NARROW BEAM ANTENNA SYSTEM WITH ANGULAR DIVERSITY," and the associated co-pending and commonly assigned continuation-in-part U.S. patent application entitled "APPARATUS, SYSTEMS AND METH- ODS FOR MULTIPLE ANTENNA TRANSMISSION IN WIRELESS COMMUNICATIONS SYSTEMS," both of which have been previously incorporated by reference.

It shall be appreciated that, although a preferred embodiment includes twelve narrow beams, any number of beams may be utilized according to the present invention. Of course, the number of beams, and thus their azimuthal width, utilized by the system will directly impact the minimum width of a shapable sector achievable by the present invention.

Taking for example the preferred embodiment wherein a twelve beam system is used, the azimuthal width of a single sector can be reduced to 60° where a demodulation Rx having two inputs per sector is used. This sector size is accomplished by feeding two substantially non-overlapping 30° beams, instead of the signal provided by two substantially overlapping 120° antennas of the prior art, into the demodulation Rx for this particular sector. The same azimuthal width might also be selected for a second sector, leaving the third sector having a width of 240°.

Of course, the azimuthal width of a single sector may be reduced to 30° where a single 30° beam is fed into the sector input of a demodulation Rx. However, the advantages of signal diversity are not realized in such a sector. Therefore, the preferred embodiment of the present invention utilizes at least two beams per sector.

Figure 3A:
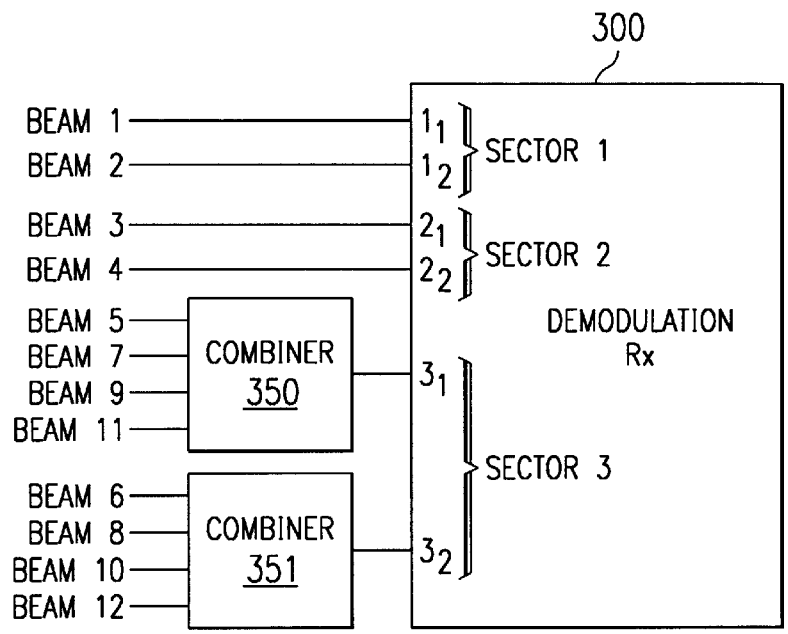
FIG. 3A illustrates a block diagram of a communication system wherein multiple beams are combined to provide various sector sizes according to the present invention.

FIG. 3A illustrates an implementation resulting in the above described three sector system having two 60° sectors and one 240° sector. With reference to FIG. 3A, demodulation Rx 300 is a typical prior art CDMA demodulation radio having two inputs per sector. Here the inputs associated with a first sector are identified as inputs 11 and 12. Likewise, the inputs associated with a second and third sector are identified as inputs 21 and 22 and 31 and 32 respectively. Therefore, where beams 1 though 12 are associated with a 12 beam system, wherein each beam has a 30° azimuthal width such as illustrated in FIG. 2, the sector sizing is as described above. Specifically, sector 1 having a 30° beam 1 and a 30° beam 2 associated with inputs 11 and 12 provides a 60° sector. Similarly, sector 2 having a 30° beam 3 and a 30° beam 4 associated with inputs $2_1$ and $2_2$ provides a 60° sector.

As demodulation Rx 300 only provides two inputs per sector, additional circuitry is necessary in order to input the plurality of beams remaining as a third sector. In a preferred embodiment, signal combiners 350 and 351 are utilized to combine the signals provided by the remaining beams of the system into the proper number of discrete signals suitable for input into the demodulation Rx utilized by the present invention.

Through the use of signal combiners, sector sizing is accomplished by summing together the beam signals so as to increase the size of the sector signal provided to the demodulation Rx. Of course, where a demodulation Rx having a sufficient number of inputs to accommodate such a plurality of signals is utilized, the use of additional circuitry, such as combiners 350 and 351, may be eliminated, if desired. Likewise, the use of circuitry other than signal combiners, such as multiplexers, may be utilized according to the present invention, if desired. However, it shall be appreciated that the signal combiners are utilized in the preferred embodiment as signals from the various combined beams are provided to the demodulation Rx simultaneously, providing simultaneous communication throughout the beams of the sector, rather than in time division multiple access (TDMA) format as is the case in the use of a typical multiplexer. Of course, where TDMA signals or multiplexing by other schemes, such as frequency division multiple access (FDMA), are acceptable, multiplexers may replace the signal combiners of the preferred embodiment.

Because the cell site radio utilizes both forward and reverse links, circuitry providing forward link sector sizing consistent with that of the reverse link discussed above may also be provided. For example, where the transmit path utilizes different code channels per sector, the circuitry illustrated in FIG. 3B may be utilized to transmit these forward path channels within the same sectors as those of the reverse link illustrated in FIG. 3A.

Figure 3B:
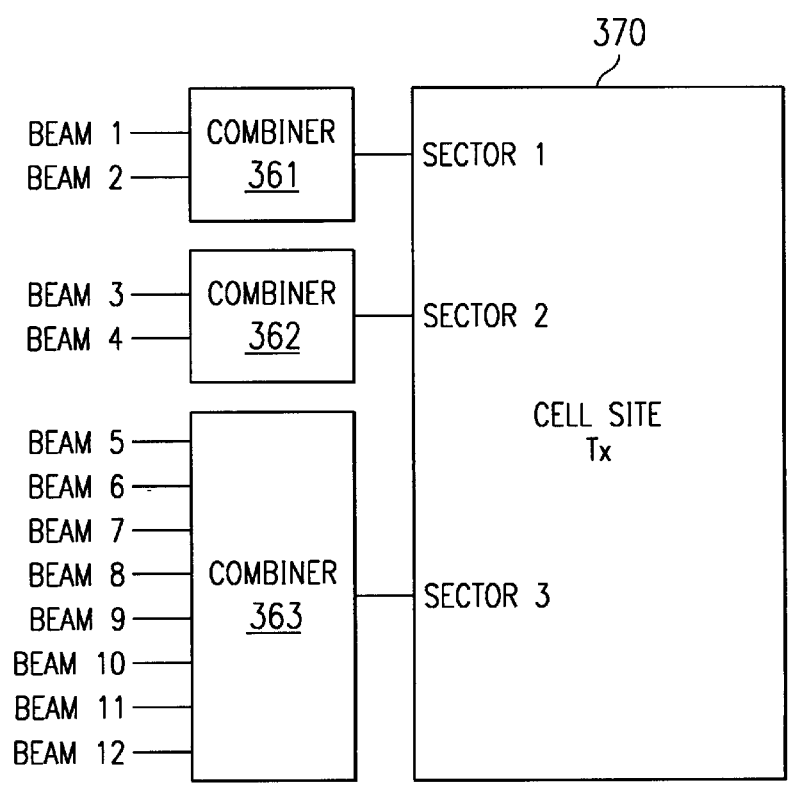
FIG. 3B illustrates a block diagram of the combining of multiple beams for the forward link of a cell site transmitter to match the various sector sizes of the system illustrated in FIG. 3A.

It shall be appreciated that the circuitry of FIG. 3B is substantially the same as that of FIG. 3A. However, as typical prior art transmit forward path radios generally have only one output per sector, all beams associated with a particular sector are coupled to this output. For example, the three sector outputs of cell site Tx 370 illustrated in FIG. 3B each include combiners to provide an output signal to sectors including the same number of beams as the reverse link illustrated in FIG. 3A. Specifically, combiners 361 and 362 provide signals to beams 1 and 2, and 3 and 4 respectively. Likewise, combiner 363 provides signals to beams 5 through 12.

It shall be appreciated that such a system is advantageous where the users of a particular cell are more heavily concentrated within a particular area within the cell rather than evenly distributed throughout. Such usage patterns may be experienced, for example, where a cell is located to include a commuter highway in its radiation pattern, or is located on the edge of a metropolitan area. Such cells might experience heavy user densities in particular areas as the user population commutes to and from work.

It shall be appreciated from the above discussion, that usage patterns which may advantageously be addressed by the present invention may change at various times of the day or week. For example, the previously described cell overlapping a commuter highway may see heavy utilization in a particular area during worker commuting times, and a more evenly distributed utilization pattern at other times. Similarly, a cell placed at the edge of a metropolitan area may see heavy utilization in an area encompassing the metropolitan area during working hours and heavy utilization in an area outside the metropolitan area during non-working hours. Therefore, it becomes obvious that further advantage may be realized by the system of the present invention by providing means by which the sizable sectors may be dynamically adjusted to accommodate the varying utilization patterns of a cell.

Figure 4A:
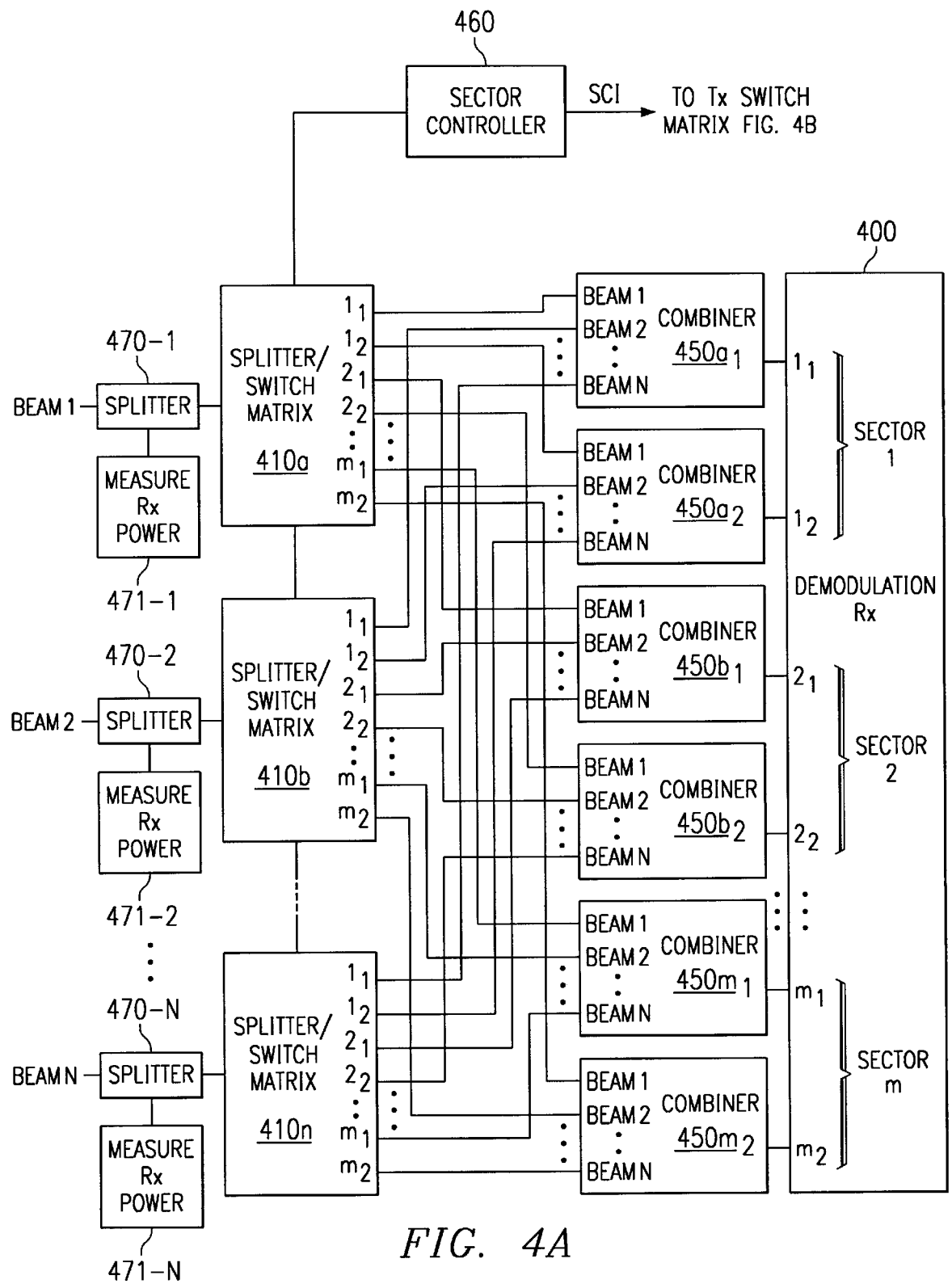
FIG. 4A illustrates a reverse link block diagram of a communication system wherein multiple beams are dynamically combined to provide selectable sector sizes according to the present invention.

FIG. 4A illustrates a preferred embodiment of the interface of signals from the various beams of a multi-beam system into a demodulation receiver, enabling a flexible sector/cell system of the present invention. Here, as in the system illustrated in FIG. 3A described above, signal combiners are provided to allow the input of multiple beams into the sector inputs of demodulation Rx 400 having M sectors. However, it shall be appreciated that, in order to provide for the input of a signal associated with any beam to any sector input, a signal combiner, illustrated as combiners $450a_1$, $450a_2$, $450b_1$, $450b_2$, $450m_1$, and $450m_2$, is associated with each sector input of demodulation Rx 400.

Furthermore, in order to provide a signal at any combination of the above described combiners, and thus the associated sector input of demodulation Rx 400 (i.e., providing the same signal at a plurality of sector inputs simultaneously), signals from the N beams are provided to splitter/switch matrixes associated with each beam; illustrated here as splitter/switch matrix 410a, 410b, and 410n. It shall be appreciated that each splitter/switch matrix splits the signal of an associated beam so as to be available for switchable connection to any combination of the aforementioned combiners. For example, the signal associated with beam 1 may be split M×(times) the number of inputs associated with each sector (so as to be available for input to signaling/scan Rx inputs associated with each of the M sectors) and be switchably connected to any combination of combiners by splitter/switch matrix 410a.

Of course, the function of the disclosed splitter/switch matrixes may be accomplished by utilizing a separate splitter in combination with a switch matrix having the proper number of inputs and outputs to provide for the switching of a signal associated with a beam to any combination of combiners. Moreover, signal amplification circuitry may be included in, or in addition to, the splitter circuitry of the preferred embodiment to provide a split signal having an acceptable magnitude. Such signal amplification may be provided in order to present each signal component of the original signal at a power level, or magnitude, substantially the same as the signal prior to its being split. Likewise, such signal amplification may be to present a split signal having a sufficient power level, or magnitude, to provide an acceptable signal to noise ratio. Where the original signal is split to provide a large number of split signal components, such amplification may be necessary in order to provide a signal having an acceptable signal to noise ratio to the inputs of demodulation Rx 400.

Of course, where it is not desired to provide the signal associated with a particular beam to more than one signal combiner, and thus its associated sector input, the splitter/switch matrixes of the present invention may omit the functionality of signal splitting, if desired. However, it shall be understood that omission of signal splitting, or a similar method of provision of multiple instances of the same signal information, is at the cost of the ability to provide overlapping coverage by the various sectors as is discussed hereinbelow.

Additionally, where it is not desired to allow for the input of a signal associated with each beam of the system to all sector inputs of the demodulation Rx, the number of outputs of the splitter/switch matrixes, as well as their associated combiner inputs, may be less than the total number of beams. However, it shall be appreciated that such a system is limited in ability to size a sector as the sector size is a function of the beam width and number of beams combined into a sector input.

By properly adjusting the splitter/switch matrixes of the present invention, various predetermined sector sizes may be realized. For example, the aforementioned combination of two 60° sectors and a single 240° sector may be realized in the following manner. By adjusting splitter/switch matrix 410a, the signal of beam 1 may be provided exclusively to combiner 450a$_1$ associated with a first input of sector 1. Likewise, by adjusting splitter/switch matrix 410b, the signal of beam 2 may be provided exclusively to combiner 450a$_2$ associated with a second input of sector 1. By similarly adjusting a second pair of splitter/switch matrixes (not shown, but represented by the ellipsis between splitter/switch matrixes 410b and 410n), associated with a third and fourth beam (not shown, but represented by the ellipsis between beams 2 and N), a second 60° sector may be defined. Similarly, adjusting an additional eight splitter/switch matrixes, associated with a remaining eight beams of a twelve beam system, such as that illustrated in FIG. 2, a third 240° sector may be defined. However, in this third sector, it shall be appreciated that adjusting of the remaining eight splitter/switch matrixes results in a combination of four beam signals switched to each of the two combiners associated with the third sector; illustrated here as combiners 450m$_1$ and 450m$_2$.

It shall be appreciated that the aforementioned arrangement has established a system wherein two 60° sectors and a single 240° sector, as described above with reference to FIG. 3A. However, it shall be appreciated that the splitter/switch matrixes of the embodiment illustrated in FIG. 4A, may be adjusted to provide sectors of sizes different than those describe above.

Of course, selection of the size of the various sectors of the present invention may be made by manually adjusting the splitter/switch matrixes. Such manual adjustment may be acceptable where, for example sector sizes are rarely, if ever, changed. However, as discussed above, it is envisioned that the sectors of the present invention will advantageously be adjusted depending on different utilization patterns throughout any given day or week. Therefore, in a preferred embodiment, a control signal is provided to adjust splitter/switch matrixes 410a through 410n in order to dynamically select sector sizes.

Referring to FIG. 4A, a control signal is provided each splitter/switch matrix by sector controller 460. It shall be understood that, although a single control interface is illustrated between all of the splitter/switch matrixes, each of these splitter/switch matrixes may be controlled independently by controller 460. Of course, sector controller 460 need not be a discrete component associated with the cell site, but may instead be an integral part of the cell's existing control circuitry. Moreover, sector controller 460 may be included as a part of a centralized control system, utilized to control a network of neighboring cell sites, rather than being embodied within the particular cell site it is associated with.

Sector controller 460 may comprise a processor-based system having a processing unit (CPU) and memory associated therewith (RAM). The RAM may have stored therein an algorithm operable to cause the CPU to adjust the splitter/switch matrixes of the present invention to switchably connect the signals of the various beams to predetermined ones of the sector inputs at various times of the day or week. Such an algorithm may be based on past or projected utilization patterns and incorporate no information on the actual utilization pattern of the cell.

Alternatively, as utilization patterns are often unpredictable and subject to change unexpectedly, in a preferred embodiment, sector controller 460 includes current utilization information, such as may be determined by controller 460 or may be provided by the cell's existing control circuitry. This current utilization information may include such information as the number of users associated with particular sectors, the number of available channels, or other resources, of particular sectors, or the signal quality associated with particular sectors or particular users within the sectors.

In addition, beams to sector mapping can be accomplished based on measurements of the received power, transmitted power, or transmitted signal to interference ratio per beam or per sector. For example, signals associated with each antenna beam may be split, such as by splitters 470-1 through 470-N, for provision to signal attribute measuring circuitry, such as Rx power measurement circuitry 471-1 through 471-N. Accordingly, a power level, or other signal attribute of interest, may be measured for each communication channel and/or beam. This information may then be provided to sector controller 460 for use in beam to sector mapping according to the present invention. From any combination of the above discussed information, sector controller 460 may adjust the splitter/switch matrixes of the present invention to provide alternative sector sizing and thus increase the number of channels, or other resources, available to a particular area within the cell, or improve signal quality associated with a sector or user.

Additionally, or in the alternative, sector controller 460 may be provided with current utilization information from a centralized apparatus (not shown) controlling a plurality of neighboring cells. Such a centralized apparatus may be provided information from each of the neighboring cells in order to make decisions as to the allocation of the various resources of the system, such as the re-use of channels at neighboring cells, the handing off of users between the cells, and the sizing of sectors at neighboring cells to provide increased capacity or signal quality. Management of such a system within a neighborhood of cells is disclosed in the above referenced co-pending and commonly assigned U.S. patent application entitled "METHOD AND APPARATUS FOR IMPROVED CONTROL OVER CELLULAR SYSTEMS."

It shall be appreciated that, as discussed above, communication within a particular sector of a cell of a cellular system is not only a function of other communications within that sector or even other sectors of that cell, but may also be affected by communications within neighboring cells. Therefore, an alternative embodiment of the present invention includes means by which to adjust the sector's effective outboard reach or length, as referenced in the direction of propagation of the radiation. It shall be appreciated that reduction of the longitudinal size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers. Thus, a system of cells utilizing the present invention may be used to provide increased signal quality as well as increased capacity without increasing the number channels available at each cell.

The above mentioned sector outboard shaping may be accomplished by putting attenuators (not shown) in the signal path between an antenna element associated with a particular beam and the signal's input into the signaling/scan Rx, such as between each output of splitter/switch matrix 410$a$ and the associated inputs of combiners 450$a_1$ through 450$m_2$. These attenuators may be controlled as described above with respect to the splitter/switch matrixes to attenuate a selected signal in order to accomplish a particular control characteristic, i.e., force a handoff of a particular mobile unit between sectors or cells. Such attenuators may be utilized to adjust the power of a transmitted signal prior to its input into the mobile Rx. Therefore, the mobile Rx may be convinced that a particular beam is providing a lower input signal strength than would otherwise be the case. As such, the mobile Rx can be artificially manipulated to either cause an in sector handoff or a handoff to another cell. Of course, these attenuators may be manually adjusted, rather than under control of an automated control system such as sector controller 460, if desired. Accordingly, the outboard reach of a particular beam may be substantially permanently selected or seasonally selected in order to provide a desired service area.

In order to provide for sector shaping in the forward path, i.e., where the transmit path utilizes different code channels per sector, switchable circuitry is preferably also disposed in the transmit signal path. Directing attention to FIG. 4B, a preferred embodiment of the switchable circuitry in the transmit path is shown. Here, the three sector outputs of the cell site Tx, such as that illustrated in FIG. 3B, are input into switch matrix 480. Switch matrix 480 is adapted with a suitable number of inputs and outputs in order to be able to switchably provide any combination of the sector signals to any of the antenna beams. In a preferred embodiment, switch matrix 480 is a 3×12 switch matrix. Of course, any combination of inputs and outputs switchable for providing the desired number of transmit signals to the desired number of antennas may be used. Moreover, discrete switch matrixes associated with the sector transmit signals or antenna beams may be utilized, rather than the single switch matrix illustrated, if desired.

It shall be appreciated that switch matrix 480 is coupled to a controller, in order to properly map the transmit signals of each of the cell site Tx to the desired beams. Preferably, sector controller 460 is utilized to control switch matrix 480, as this controller may be economically utilized to control both the receive sector and transmit sector sizes utilizing much of the same information. Of course, separate controllers, or controllers operating substantially independently, may be utilized in the transmit and receive signal paths, if desired.

As discussed above, it may be desirable to adjust the magnitude of the transmit signal to the mobile in order to effect the outboard reach of the cell site with respect to a particular signal or in a particular beam. Accordingly, attenuators, such as those discussed above with respect to the receive signal path, may be placed in the transmit signal path. Directing attention again to FIG. 4B, a preferred embodiment of attenuators, disposed in the transmit signal path are illustrated as attenuators 484-1 through 484-12. As with the attenuators of the receive path, attenuators 484-1 through 484-N may be controlled by sector controller 460. Therefore, in a preferred embodiment, transmit signal splitters, such as splitters 481-1 through 481-12, are used to split a transmit signal associated with each beam for provision to a measurement circuit, such as Tx measurement circuits 482-1 through 482-12. Tx measurement circuits 482-1 through 482-N may make such measurements as a total amount of energy associated with a particular beam or a particular signal to be transmitted by a particular beam. This information may be utilized by a controller adapted to control attenuators 484-1 through 484-12, such as sector controller 460, in order to attenuate a signal to be transmitted by a particular beam. Such adjustments may be added so as to result in a selected mobile receiving a lower power signal from the cell site than would otherwise be transmitted and, thus, fool the mobile into requesting a handoff. Accordingly, the present invention may operate to force a handoff of a particular mobile that may be adequately serviced by an adjacent sector or cell in order to free up capacity for another mobile unable to adequately communicate with another sector or cell.

Of course, rather than the attenuators in the transmit signal path operating under control of sector controller 460, they may receive control signals from other sources as discussed above. Likewise, these attenuators may be manually adjusted to provide desired cell coverage substantially permanently or adjusted periodically, such as seasonally.

As typical prior art transmit forward path radios generally have only one output per sector, a preferred embodiment of the present invention utilizes delays introduced in the transmit signal path. Directing attention to FIG. 4B, a preferred embodiment of delays disposed in the transmit signal path are illustrated as delays 483-2 through 483-12. These delays may be any form of signal delay device, such as surface acoustic wave device (SAW), a predetermined length of cable, a digital signal processor (DSP), or the like.

Figure 4B:
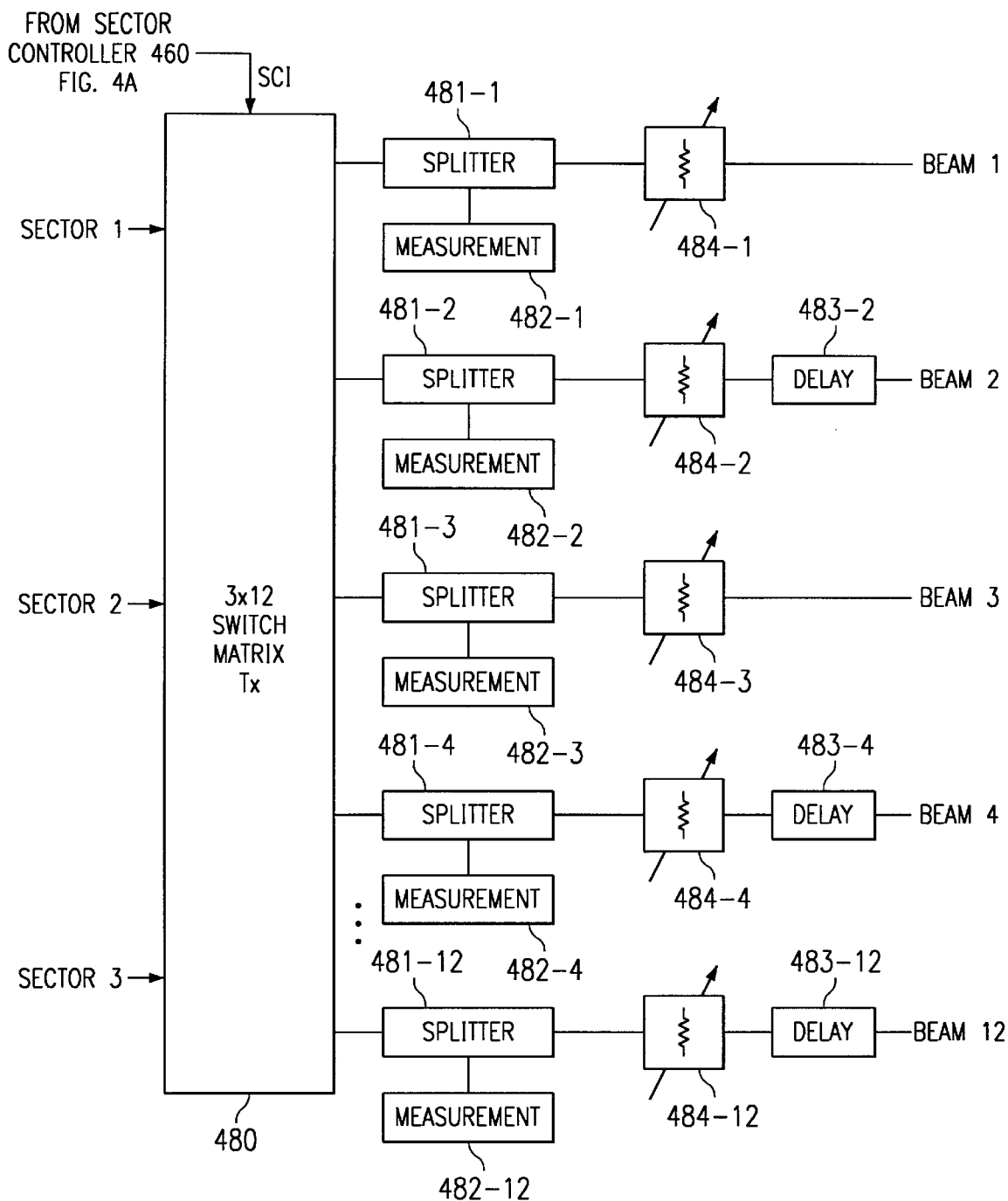
FIG. 4B illustrates a forward link block diagram of a communication system, wherein multiple beams are dynamically combined to provide selectable sector sizes according to the present invention.

According to a preferred embodiment of the present invention, a transmit signal associated with a particular sector, originally appearing in a signal sector signal from the cell site Tx, is provided to at least two antenna beams to provide for transmit diversity, in addition to the adjustable sector sizing of the present invention. In order to provide an increased likelihood of the split sector transmit signal, as transmitted within the two or more antenna beams, will not be substantially correlated, a delay is introduced in at least one of the split signal paths. It is anticipated that the antenna beams associated with a particular sector will typically be adjacent, so as to define a contiguous sector. Therefore, the delays of the present invention are preferably disposed in alternating ones of the transmit signal paths, as illustrated in FIG. 4B. Accordingly, signals radiated within adjacent beams will be provided with signal diversity in addition to the angular diversity provided by the different views of the beams. Of course, where a sector is defined to utilize more than two beams, the signals of alternating ones of the beams will be provided with an identical delay. However, this is not anticipated to effect the desired diversity adversely as the angular diversity of alternating ones of the beams is acute enough to provide sufficient signal diversity. Of course, each beam, or subsets thereof, may be provided with different amounts of delay in the transmit signal path, if desired.

Figure 4C:
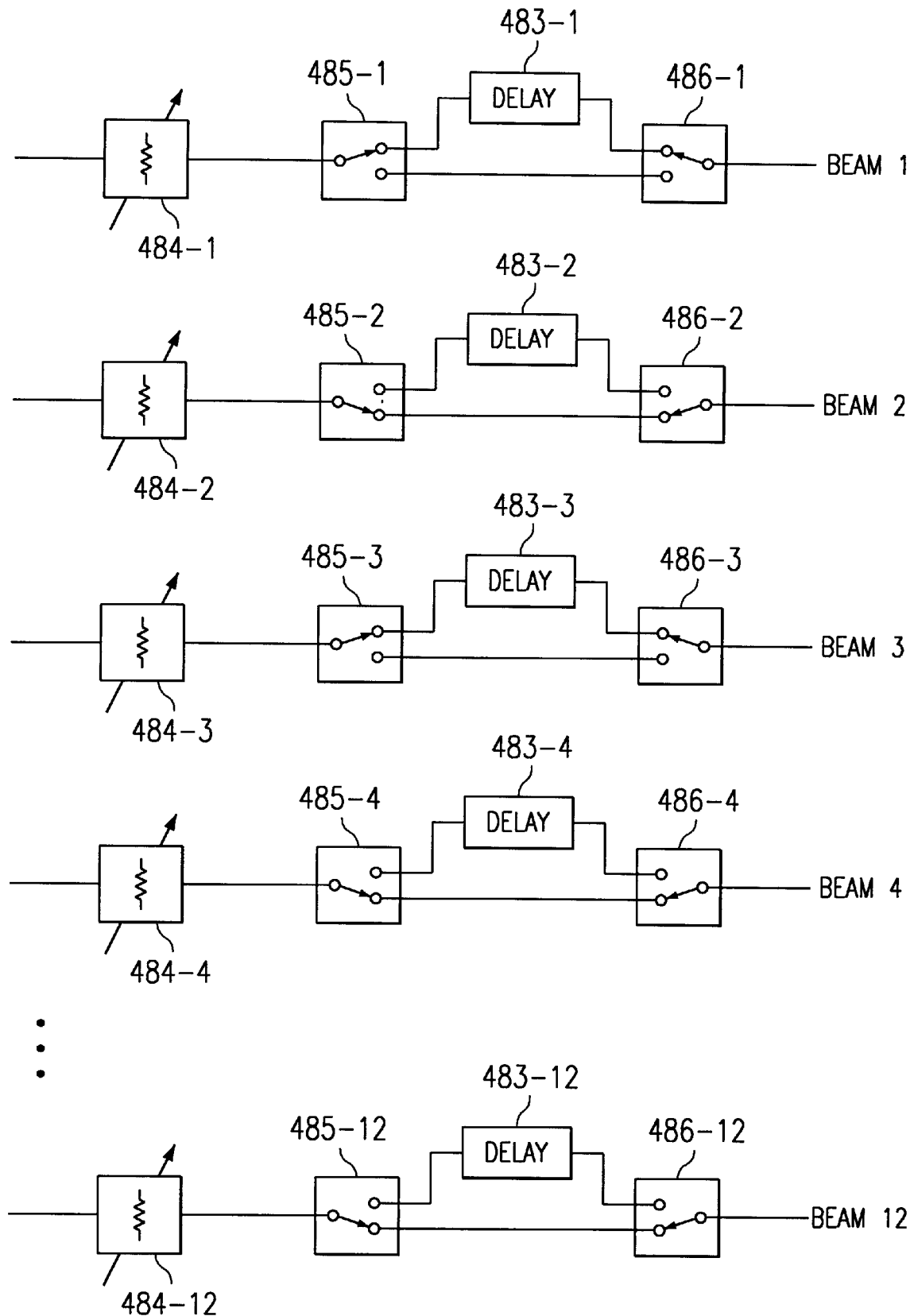
FIG. 4C illustrates an alternative arrangement of delays in the forward link of FIG. 4B.

An alternative embodiment of the introduction of various delays in the transmit signal path is illustrated in FIG. 4C. Here a portion of the forward link system shown in FIG. 4B is shown utilizing switches 485-1 through 485-12 and 486-1 through 486-12 to selectively switch delays 483-1 through 483-12 in or out of their respective signal paths. Accordingly, an arbitrary arrangement of delays in the transmit signal path, preferably selected so as to result in substantially uncorrelated signals, may be dynamically selected. Switches 485-1 through 485-12 and 486-1 through 486-12 may operate under control of sector controller 460, or another control system, in order to selectively switch into the various transmit signal paths an amount of delay to result in substantially uncorrelated signals when received by mobiles operating within the cell.

It shall be appreciated that the alternative embodiment of FIG. 4C may include selectable delays in addition to the single delay for each signal path shown. Accordingly, various delay amounts might be selected for beams assigned to a particular sector, for example. Moreover, delays 483-1 through 483-12 may each be selected to introduce a different amount of delay, if desired.

Figure 6:
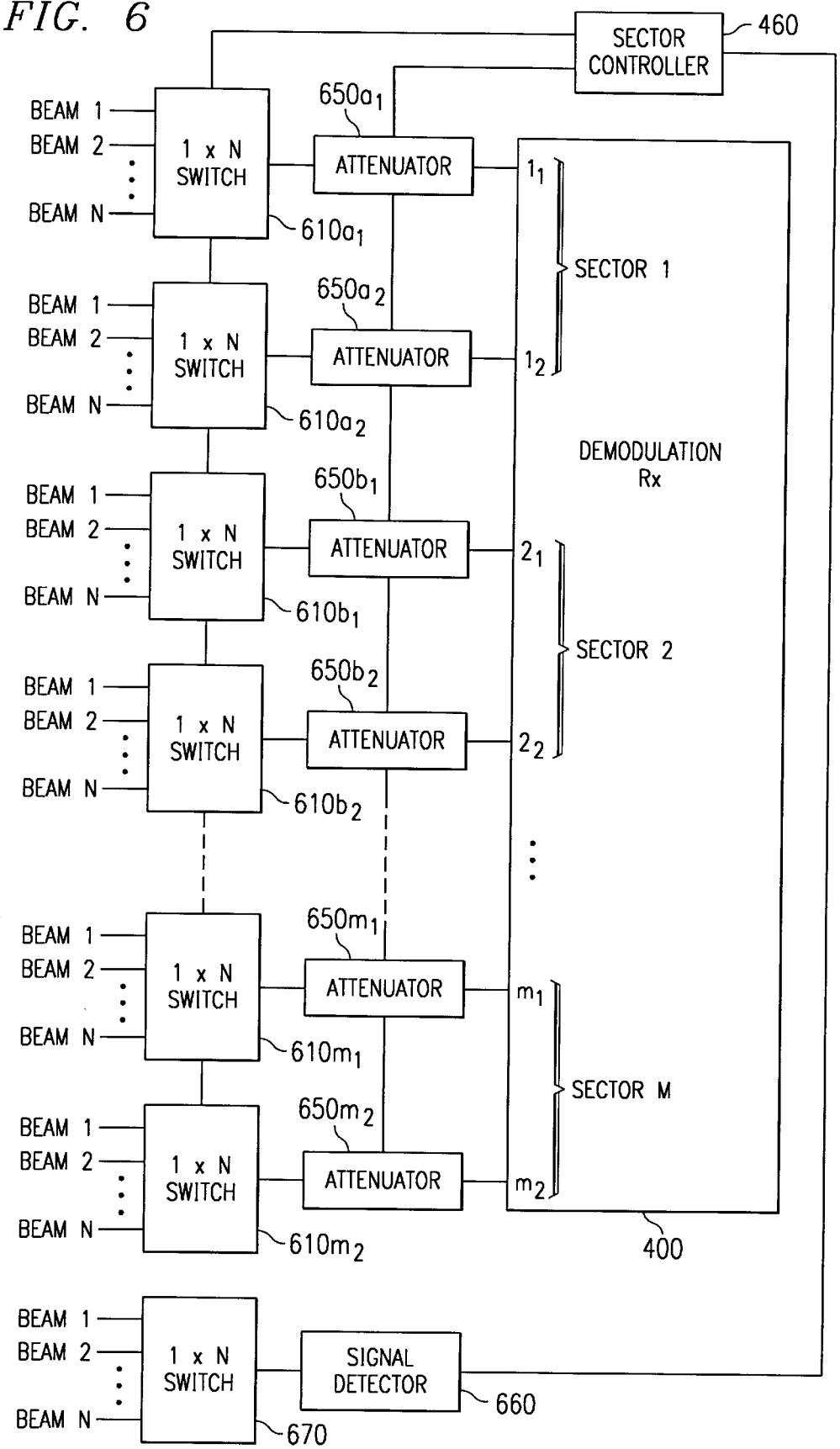
FIG. 6 illustrates a block diagram of a communication system wherein particular signals of interest may be dynamically routed and attenuated to provide selectable sector sizing according to the present invention.

Directing attention to FIG. 6, an alternative embodiment of the present invention is illustrated suitable for providing the signals of the two beams to demodulation Rx 400. It shall be appreciated that this embodiment does not utilize combiners 450$a_1$ through 450$m_2$.

Because only the beams having the strongest receive signal of interest are switched to the input of demodulation Rx 400, the number of switch matrixes utilized in this embodiment is associated with the number of sector inputs of demodulation Rx 400 rather than the number of beams as in the above described embodiment. Therefore, in order to provide a signal from any beam to a selected sector input of demodulation Rx 400, signals from each of the N beams are provided to switch matrixes associated with each sector input; illustrated here as switch matrixes 610$a_1$ through 610$m_2$. It shall be appreciated that the use of such switch matrixes may be utilized to provide signals from any beam to multiple sector inputs simultaneously and, thus, provide overlapping coverage by the various sectors as is discussed hereinbelow. Moreover, this arrangement of switch matrixes may be utilized in the transmit signal path (not shown) to provide the sector beam mapping of the present invention by coupling switch matrixes between the outputs of the cell site Tx and the multiple antenna beams. Of course, to provide the desired transmit signal diversity, delays may be disposed in the signal path. Preferably, such delays are provided in alternating ones of the signal paths between the switch matrixes and the antennas associated with each of the beams, i.e., between switch 610$a_1$ and beams 2, 4, . . . N.

As in the embodiment discussed above, the switch matrixes of this embodiment are controlled by a control signal provided each switch matrix by sector controller 460. It shall be understood that, although a single control interface is illustrated between all of the switch matrixes, that each of these switch matrixes is controlled independently by controller 460. Of course, sector controller 460 need not be a discrete component associated with the cell site, but may instead be an integral part of the cell's existing control circuitry. Moreover, sector controller 460 may be included as a part of a centralized control system, utilized to control a network of neighboring cell sites, rather than being embodied within the particular cell site it is associated with.

As with the above discussed embodiment, sector controller 460 may comprise a CPU and RAM to control the sectors according to the present invention, such as through the use of an algorithm basing switching decisions on past or projected utilization patterns or an algorithm basing such decisions on current utilization as determined from this cell or a neighborhood of cells. Current utilization information may be determined by controller 460 or may be provided by the cell's existing control circuitry. Sector controller 460 may also be provided with current utilization information from a centralized apparatus (not shown) controlling a plurality of neighboring cells. As discussed in detail above, this current utilization information may include such information as the number of users associated with particular sectors or cells, the number of available channels, or other resources, of particular sectors or cells, or the signal quality associated with particular sectors, cells or users.

It shall be appreciated that, as discussed above, communication within a particular sector of a cell of a cellular system is not only a function of other communications within that sector or even other sectors of that cell, but may also be affected by communications within neighboring cells. Therefore, this embodiment of the present invention includes means by which to adjust the sector's effective outboard reach or length, as referenced in the direction of propagation of the radiation. It shall be appreciated that reduction of the longitudinal size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers. Thus, a system of cells utilizing the present invention may be used to provide increased signal quality as well as increased capacity without increasing the number channels available at each cell.

The above mentioned sector outboard shaping in the receive link is preferably accomplished through adjusting attenuators 650$a_1$ through 650$m_2$ provided in the signal paths between the switch matrixes and the demodulation Rx inputs. These attenuators may be utilized to adjust the power of a transmitted signal prior to its input into the demodulation Rx. As described above with respect to the switch matrixes, each of the attenuators may be individually controlled by controller 460. Therefore, the cell site may be convinced that a particular signal is being received at a lower strength than would be received otherwise. As such, the cell site can be artificially manipulated to either cause an in sector handoff or a handoff to another cell.

The above mentioned sector outboard shaping in the transmit link is preferably accomplished through adjusting attenuators or signal gain devices, such as attenuators $650a_1$ through $650m_2$, provided in the signal paths between the switch matrixes and the mobile Rx. These attenuators may be utilized to adjust the power of a transmitted signal prior to its transmission to the mobile Rx. As described above with respect to the switch matrixes, each of the attenuators may be individually controlled by controller 460. Therefore, the mobile Rx may receive a signal at a lower strength than would be received otherwise. As such, the mobile Rx can be artificially manipulated to either cause an in sector handoff or a handoff to another cell.

It shall be appreciated, although outboard shaping may be accomplished through the use of attenuators with either of the above described embodiments, that the alternative embodiment illustrated in FIG. 6 utilizes a number of such attenuators equal to the sector inputs of demodulation Rx 400. Such an arrangement of attenuators allows the sector controller to adjust a signal strength of the signal of interest independently at any or all of the sector inputs.

However, in order to independently adjust a signal strength of the signal of interest independently at each of the sector inputs with the embodiment illustrated in FIG. 4, the number of attenuators must equal the number of beams times the number of sector inputs. This is because if fewer attenuators were used, such as by placing them between the beam signal source and the splitter/switch matrixes 410*a* through 410*n* or between combiners $450a_1$ through $450m_2$ and the sector inputs, the signal strength for multiple sector inputs or for multiple beams would be adjusted rather than their being independently adjusted. The former would result in all signals received on a particular beam being adjusted similarly regardless of the sector input it is to be input into. The latter would result in all signals input into a sector input being adjusted similarly regardless of the beam from which it originated.

It shall be appreciated that attenuation of ones of the various signals associated with the beams of the present invention effectively decreases the outboard, or longitudinal, size of the sector including that beam, thereby decreasing the size of the sector or cell. For example, increasing the amount of the attenuation of an attenuator associated with a particular beam, which translates into a reduction in signal strength of that beam, which beam's signal is routed to a particular input port of the demodulation Rx results in the reduction of the range of this antenna beam of the system as seen at the input port of the demodulation Rx. Where the sector is split into a 60° system, as described above, for example, the signals on the two antenna beams could be attenuated by a select amount of and, thus, reduce the range of this particular sector of the cell to a predetermined length.

The above mentioned forced handoff of users of a particular sector/cell by attenuating the signal received or transmitted to from the user may be advantageous where the handed off user, or other user of the cell, has an interference problem, such as might be caused by frequency re-use interference or an undesirable carrier to noise ratio. The forced handoff of a particular user could be utilized to improve signal quality by providing the user with a better signal from another sector/cell.

For example, where there is interference as a result of using certain channels on the two beams comprising the above discussed 60° sector, by utilizing attenuators in the signal paths an effective reduction in the size of that specific sector could be accomplished. As a result of the reduced effective sector size, communication devices in the sector would be handed off to be serviced by an adjacent sector or cell, thereby reducing the interference that this sector is causing other users.

Figure 5:
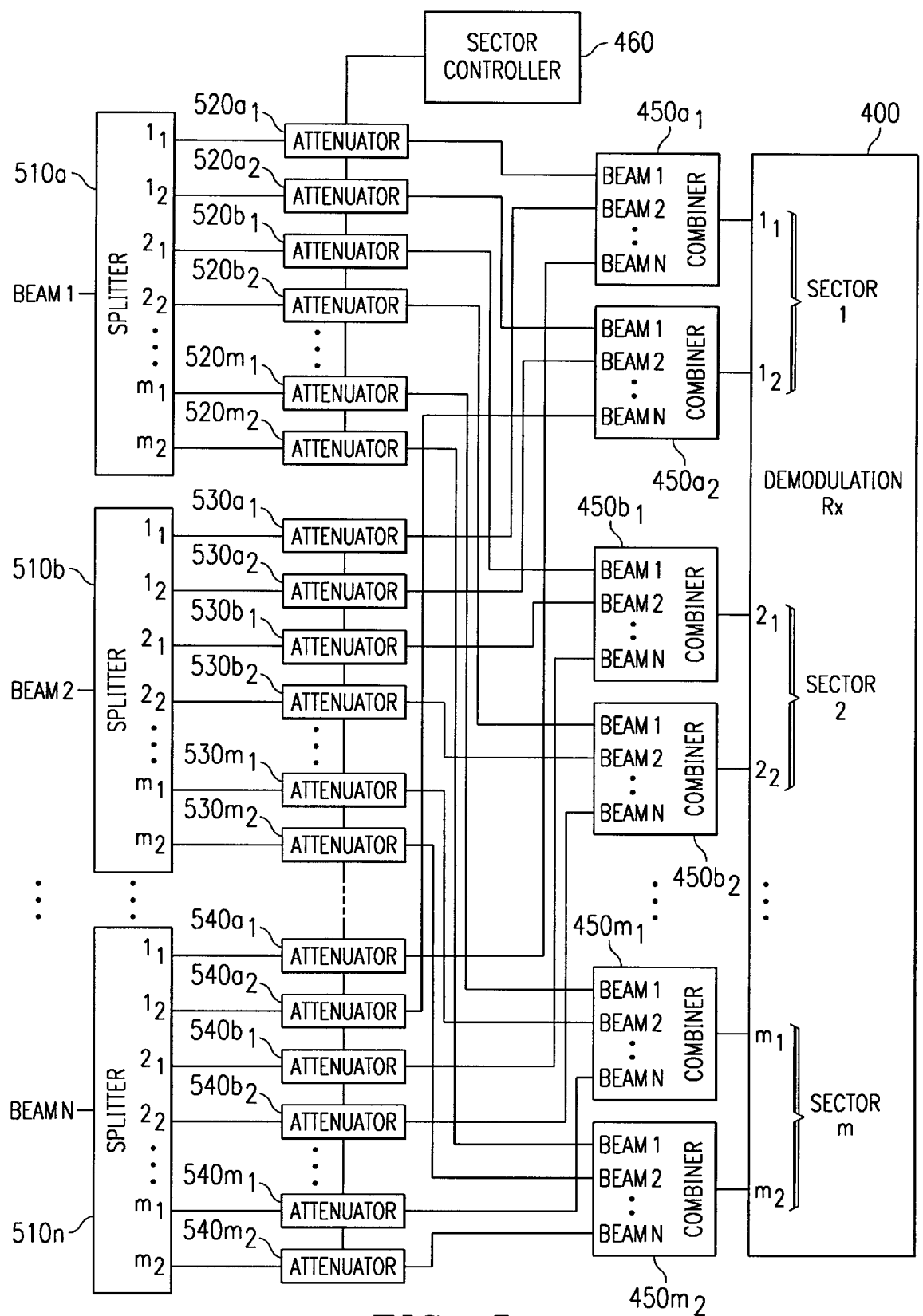
FIG. 5 illustrates a block diagram of a communication system wherein signals associated with multiple beams may be dynamically attenuated and combined to provide selectable sector sizing according to the present invention.

Recognizing that interruption in a signal path may be accomplished by an attenuator adjusted to provide impedance approaching infinity, or an open circuit, an alternative preferred embodiment of the present invention utilizes attenuators exclusive of switch matrixes, as is illustrated in FIG. 5. Of course, as previously discussed, attenuators can be utilized within the signal paths of the switches of FIGS. 4A, 4B or 6 to provide signal attenuation in addition to signal switching, if desired.

Referring to FIG. 5, it can be seen that signals associated with the various beams are provided demodulation Rx 400 through the signal combiners $450a_1$ through $450m_2$ as in the embodiment illustrated in FIG. 4A. However, the splitter/switch matrix of the previously discussed embodiment have been replaced with splitters 510*a* through 510*n* in combination with attenuators $520a_1$ through $520m_2$, $530a_1$ through $530m_2$, and $540a_1$ through $540m_2$. Of course, the splitters and associated attenuator sets may be combined into a single apparatus, much like the splitter/switch matrixes of FIG. 4A, if desired.

Referring again to FIG. 5, a control signal is provided each attenuator by sector controller 460. It shall be appreciated, although a single control interface is illustrated between controller 460 and the attenuators of this embodiment, that each of the attenuators may be independently adjusted by sector controller 460. As in the above described embodiment, sector controller 460 need not be a discrete component associated with the cell site, but may instead be an integral part of the cell's existing control circuitry. Similarly, sector controller 460 may be included as a part of a centralized control system, utilized to control a network of neighboring cell sites, rather than being embodied within the particular cell site it is associated with.

As previously mentioned, sector controller 460 may comprise a CPU and RAM. This RAM may have stored therein an algorithm operable to cause the CPU to adjust the attenuators of the present invention to increase their impedance to approach infinity, to result in a discontinuation of a particular signal path, or to decrease impedance, to result in variously attenuated signal paths ("switching"). It shall be appreciated that such adjustment results in the switching of the signals of the various beams, at various power levels, to predetermined ones of the sector inputs. Such switching may be at various times of the day or week as was the case in the aforementioned embodiment.

Switching by such an algorithm may be based on past or projected utilization patterns and incorporate no information on the actual utilization pattern of the cell. Alternatively, in a preferred embodiment, sector controller 460 includes current utilization information input such as may be determined by controller 460 or may be provided by the cell's existing control circuitry. This current utilization information may include such information as the number of users associated with particular sectors, the number of available channels, or other resources, of particular sectors, and the signal quality associated with particular sectors or particular users within the sectors. From this information, sector controller 460 may adjust the attenuators of the present invention to provide alternative sector sizing, either by establishing/discontinuing a signal path associated with a particular beam to a particular sector input or by increasing/reducing the effective longitudinal size of beams of a particular sector, and thus increase the number of channels, or other resources, available to a particular area within the cell, or improve signal quality associated with a sector or user.

Additionally, or in the alternative, sector controller 460 may be provided with current utilization information of a plurality of neighboring cells from a centralized apparatus as described above. Such a centralized apparatus may be provided information from each of the neighboring cells in order to make decisions as to the allocation of the various resources of the system, such as the re-use of channels at neighboring cells, the handing off of users between the cells, and the sizing of sectors at neighboring cells to provide increased capacity or signal quality.

It shall be appreciated that, although the use of two 60° and one 240° sector has been discussed in the above examples, such sector sizing is purely in the way of example and is in no way intended to be a limitation of the present invention. Any number of beams may be composited into sectors according to the present invention. For example, the present invention could be utilized to provide a single 60° sector concurrent with two 150° sectors. Likewise, the present invention is equally suited to provide homogeneous sectors, such as the three 120° sectors of the prior art systems.

Additionally, it is also possible, according to the present invention, to provide all of the beams to each sector input to essentially provide an omni cell site. For example, in the twelve beam system described herein, signals from all twelve beams would be provided to inputs associated with each sector of the demodulation Rx. Likewise, all beams could be associated with the transmit sector signals of cell site Tx. Here, instead of having 120° per sector as in the prior art, each sector covers a full 360°, or using the above described two input demodulation Rx, 180° per each sector input. For example, using every other beam for input number 1 and every other beam for input number 2 associated with a first sector, this first sector now covers a full 360° about the cell site. Similarly, the two inputs associated with the remaining sectors may be provided signals from each beam. This results in each sector having 360° azimuthal coverage in the back tune configuration and, therefore, each channel, regardless of the sector with which it is associated, being available throughout the cell.

Similarly, it is also possible to combine signals from the same beams into sector inputs of two or more sectors to essentially provide overlapping sectors of various sizes. For example, in the twelve beam system described herein, signals from six of the beams could be provided to inputs associated with the first two sectors of the demodulation Rx. Here, instead of having 120° per sector as in the prior art, each sector covers 180°; the first and second sector providing 180° overlapping coverage and the third sector providing coverage for the remaining 180°. For example, using every other beam of the first six beams for input number 1 and the remaining beams of this six for input number 2 associated with a first sector, this first sector now covers 180° about the cell site. Likewise, using every other beam of the first six beams for input number 1 and the remaining beams of this six for input number 2 associated with a second sector, this second sector also covers the same 180° about the cell site as the first sector. Coverage for the remaining 180° may be provided by using every other beam of the last six beams for input number 1 and the remaining beams of this six for input number 2 associated with a third sector. Such overlapping sector configurations provide the channels associated with each overlapping sector throughout the area of overlap.

Although the use of alternating adjacent beams has been discussed with respect to the two inputs associated with a particular sector of the demodulation Rx, it shall be appreciated that the present invention is not limited to such an arrangement. Signals from adjacent beams may be combined by a signal combiner to the same input of a sector input pair according to the present invention.

However, it shall be appreciated that inputting adjacent beam signals to alternate inputs of a sector input pair is preferred so as to provide a better quality signal by increasing signal diversity between the signals input to each input of the sector input pair. Through the angular diversity associated with the collocated beam sources disposed to "see" different wave fronts, adjacent beam signals provided to alternate inputs of a sector input pair may provide signal diversity where adjacent beam signals provided to the same inputs of a sector input pair may not. For example, where a communication device is located such that its signal is received only within two adjacent beams of a four beam sector, provision of these two adjacent beam signals to a single sector input would not provide signal diversity whereas alternating input of adjacent beams to the sector input pair of the demodulation Rx would provide signal diversity.

Furthermore, it shall be appreciated that, although a three sector system has been discussed, the present invention is not limited to the provision of three sectors. The present invention may provide dynamic sector sizing of any number of sectors controllable by the associated demodulation Rx and cell site Tx. For example, the present invention may provide two sectors rather than the three discussed. Similarly, the present invention may provide a number of sectors in excess of the three sectors described in a preferred embodiment, such as is represented by the M sectors of demodulation Rx 400.

Similarly, it shall be understood that the present invention is not limited to the provision of two signals per sector input. By using various arrangements of the aforementioned switch matrixes and/or attenuators in combination with signal combiners (if needed), the present invention may provide a number of signals associated with particular beams to any number of sector inputs.

Furthermore, it shall be understood that the present invention is not limited to utilization of a twelve beam system as described herein. Any number of beams may be utilized to provide the dynamically sizable sectors of the present invention. Of course, where the number of beams utilized is different than discussed above, the individual beam width may be greater or less than the 30° beam width used in the above examples. Therefore, it shall be appreciated that use of a different number of beams may result in a different minimum sector width as a result of combining such beams.

Moreover, it shall be appreciated that the use of equally sized beams is not a limitation of the present invention. Beams of different azimuthal width may be utilized to provide the dynamically sizable sectors of the present invention. For example, where a particular area within a cell is likely to be utilized by only a limited number of users, such as where the cell overlays a mountainous region causing signal shadows or where the cell includes other areas of limited user access, i.e., an ocean, a few beams may be sized to substantially cover this area so as not to necessitate the provision of a number of beams for a very few possible users.

Although the present invention and its advantages have been described in detail, it should be understood that various changes, substitutions and alterations can be made herein without departing from the spirit and scope of the invention as defined by the appended claims.

What is claimed is:

1. A system for dynamically adjusting a sector size of a plurality of sectors of a radiation pattern, the radiation pattern impacting a communication device having a plurality of inputs, wherein ones of said plurality of inputs are associated with a particular sector of said plurality of sectors of said radiation pattern, and wherein sectors utilize the same frequency and communication channels within said frequency are differentiated by a channel attribute, where said channel attribute is a code or a code delay, said system comprising:

means for providing a plurality of predefined narrow beams composited to form said radiation pattern, each beam having a discrete signal associated therewith suitable for input into particular inputs of said plurality of inputs, wherein a sector of said plurality of sectors is at least in part defined as a function of ones of said discrete signals input into a same particular input of said communication device;

means for determining forward and reverse traffic loading across beams of the sectors; and means controlled by said determining means for periodically altering said ones of said discrete signals input into said same particular input of said communication device.

2. The system of claim 1, wherein a width of at least one of said sectors is at least in part defined as a function of a number of said discrete signals input into said same particular input of said communication device.

3. The system of claim 2, wherein ones of said sectors overlap, said sector overlap being a function of ones of said discrete signals being simultaneously input into a plurality of inputs of said communication device, ones of said plurality of inputs being associated with different sectors of said plurality of sectors.

4. The system of claim 1, further comprising:

means for adjusting a power level of at least one signal associated with said plurality of beams, wherein a length of at least a portion of one of said sectors is determined by power level adjustment of said signal input into said particular input of said communication device.

5. The system of claim 4, wherein said power level adjusting means comprise said periodic altering means, said periodic altering of said ones of said discrete signals input into said same particular input of said communication device being accomplished by adjusting said power level adjusting means to result in a signal having an insignificant power level input into select signal inputs of said plurality of inputs.

6. The system of claim 1, wherein said determining means comprise:

means for monitoring received power on at least one of said beams.

7. The system of claim 1, wherein said determining means comprise:

means for monitoring a transmitted signal to interference ratio on at least one of said beams.

8. The system of claim 1, wherein said determining means comprise:

means for monitoring transmitted power on at least one of said beams.

9. The system of claim 1, wherein said determining means comprise means for establishing external control for selected periods of time.

10. The system of claim 9, wherein said determining means further comprise information provided by a centralized controller operating to control a plurality of cooperating communication devices.

11. The system of claim 1, wherein said determining means comprise information regarding a particular channel within said beam signals.

12. The system of claim 11, wherein said information comprises data pertaining to the relative traffic loading among said beams.

13. A system for dynamically adjusting a sector size of a plurality of sectors of a radiation pattern, the radiation pattern associated with a communication device having a plurality of outputs, wherein ones of said plurality of outputs are associated with a particular sector of said plurality of sectors of said radiation pattern, wherein all sectors utilize the same frequency, and wherein communication channels within said frequency are differentiated by a code, said system comprising:

means for providing a plurality of predefined narrow beams composited to form said radiation pattern, ones of said beams switchably coupled to ones of said plurality of outputs, wherein a sector of said plurality of sectors is at least in part defined as a function of ones of said beams coupled to a particular one of said plurality of outputs;

means for determining forward and reverse traffic loading across beams of the sectors; and means controlled by said determining means for periodically altering said one of said switchable couplings between said plurality of outputs and ones of said beams.

14. The system of claim 13, wherein a width of at least one of said sectors is at least in part defined as a function of a number of said beams switchably coupled to ones of said plurality of outputs.

15. The system of claim 14, wherein ones of said sectors at least partially overlap, said sector overlap being a function of ones of said outputs being simultaneously switchably coupled to a same said beam.

16. The system of claim 13, further comprising:

means for adjusting a power level of at least one signal switchably coupled to ones of said beams, wherein a length of at least a portion of one of said sectors is determined by power level adjustment of said signal.

17. The system of claim 13, wherein said determining means comprise;

means for monitoring a signal attribute of at lease one of said outputs selected from the group consisting of:
a transmitted power level associated with one of said sectors;
a transmitted power level associated with one of said code channels; and
a transmitted power level associated with one of said beams.

18. The system of claim 13, wherein said determining means comprise:
means for monitoring a signal attribute selected from the group consisting of:
a code channel receive signal strength; and
a received signal to interference ratio.

19. The system of claim 13, wherein said determining means comprise information provided by a centralized controller operating to control a plurality of cooperating communication devices.

20. The system of claim 13, further comprising:
means for providing a signal associated with said particular one of said plurality of outputs to the ones of said beams defining said sector without substantial correlation.

21. The system of claim 20, wherein said means for providing a signal associated with said particular one of said plurality of outputs comprises a delay in a signal path coupling ones of said beams to ones of said plurality of outputs.

22. The system of claim 21, wherein said delay is a switchable delay.

23. The system of claim 21, wherein said delay is provided by a device selected from the group consisting of:
a surface acoustic wave device;
a predetermined length of cable; and
a digital signal processor.

24. A system for providing a plurality of variable size sectors in a radiation pattern including a plurality of predefined beams, each beam providing a discrete beam input signal suitable for input into a demodulation receiver having a plurality of inputs, each beam also providing radiation of a discrete beam output signal substantially within a predefined area, said beam output signals adapted to receive a signal output from a cell site transmitter having a plurality of outputs, wherein ones of said plurality of demodulation receiver inputs and ones of said plurality of cell site transmitter outputs are associated with sectors of said plurality of sectors, said system comprising:
a plurality of beam input signal path control means for switchably providing ones of said beam input signals to select ones of said demodulation receiver inputs, wherein a sector of said plurality of sectors is at least in part defined as a function of switchable control of said input control means;
a plurality of beam output signal path control means for switchably providing ones of said cell site transmitter outputs to select ones of said beam output signals, wherein a sector of said plurality of sectors is at least in part defined as a function of switchable control of said output control means; and
control means for controlling said input control means and said output control means depending on utilization patterns of users in said variable size sectors.

25. The system of claim 24, wherein an azimuthal size of said variable size sectors is a function of a number of said beam input signals provided to said inputs of said demodulation receiver associated with a particular sector.

26. The system of claim 24, wherein an azimuthal size of said variable size sectors is a function of a number of said beam output signals provided from an output of said cell site transmitter associated with a particular sector.

27. The system of claim 24, wherein a number of beam input signals associated with a particular variable size sector and a number of beam output signals associated with said same particular variable size sector are the same.

28. The system of claim 24, wherein a number of beam input signals associated with a particular variable size sector and a number of beam output signals associated with said same particular variable size sector are different.

29. The system of claim 24, wherein at least one of said plurality of beam signal input path control means and said beam signal output path control means comprise a switch matrix.

30. The system of claim 29, further comprising:
attenuation means for attenuating at least one beam input signal of said plurality of beam input signals, wherein attenuation of said beam signal is operable to adjust a longitudinal size of at least a portion of a variable size sector of said plurality of variable size sectors.

31. The system of claim 29, further comprising:
attenuation means for attenuating at least one beam output signal of said plurality of beam output signals, wherein attenuation of said beam signal is operable to adjust a longitudinal size of at least a portion of a variable size sector of said plurality of variable size sectors.

32. The system of claim 24, wherein said control means substantially automatically controls said input control means and said output control means to provide dynamic size adjustment of ones said plurality of variable size sectors.

33. The system of claim 32, wherein said control means operates to substantially automatically control said input control means and said output control means as a function of communication information determined by said system.

34. The system of claim 32, wherein said control means operates to substantially automatically control said input control means and said output control means as a function of a signal provided by a centralized controller operating to control a plurality of cooperating communication systems.

35. The system of claim 24, wherein ones of said beam output signal paths include a delay device.

36. The system of claim 35, wherein said ones of said beam output signal paths including said delay device are associated with alternating ones of said beams.

37. The system of claim 35, wherein said delay device is switchably selectable.

38. A method for providing a variable size sector in a radiation pattern including a plurality of predefined beams each having a discrete beam signal for use with a transceiver apparatus having a plurality of ports, wherein ones of said plurality of ports are associated with a particular sector of a plurality of sectors identifiable in said radiation pattern, said method comprising the steps of:
coupling at least one of said plurality of beam signals to more than one port of said plurality of ports of said transceiver apparatus; and
selecting said ports of said transceiver apparatus for coupling of ones of said plurality of beam signals based at least in part on a particular sector said ones of said beam signals are to be associated with.

39. The method of claim 38, further comprising the step of:
switching a switch matrix associated with a particular beam signal of said plurality of beam signals to switchably communicate said particular beam signal to a select port of said transceiver apparatus.

40. The method of claim 38, further comprising the step of:
switching a switch matrix associated with a particular port of said plurality of ports of said transceiver apparatus to switchably communicate at least one particular beam signal of said plurality of beam signals to said particular port of said transceiver apparatus.

41. The method of claim 38, further comprising the step of:
adjusting a set of attenuators associated with a particular beam signal of said plurality of beam signals to allow communication of a particular beam signal of said plurality beam signals to a select port of said transceiver apparatus.

42. The method of claim 41, wherein a size of said variable size sector is determined by attenuation of said beam signal provided to said ports of said transceiver apparatus associated with a particular sector.

43. The method of claim 38, wherein a size of said variable size sector is determined by a number of said beam signals provided to said ports of said transceiver apparatus associated with a particular sector.

44. The method of claim 43, wherein said variable size sector azimuthally overlaps another sector of said plurality of sectors, said overlap being a function of a same beam signal being simultaneously provided to a plurality of ports of said transceiver apparatus associated with different sectors of said plurality of sectors.

45. The method of claim 38, further comprising the step of:
managing said provision of ones of said plurality of beam signals to select ports of said transceiver apparatus to dynamically adjust a size of said variable size sector.

46. The method of claim 45, wherein said managing step operates to substantially automatically adjust a size of said variable size sector as a function of information determined by said system.

47. The method of claim 45, wherein said managing step operates to substantially automatically adjust a size of said variable size sector as a function of a signal provided by a centralized controller operating to control a plurality of cooperating communication systems.

48. The method of claim 38, further comprising the step of:
delaying at least one of said coupled ones of said plurality of beam signals with respect to another one of said coupled ones of said plurality of beam signals.

49. The method of claim 48, wherein said delaying step comprises the step of:
switching a delay element into a signal path.

50. The method of claim 48, wherein said delaying step comprises the step of:
delaying signals associated with alternating ones of said beam signals.

51. An apparatus for dynamically adjusting sector size of a plurality of sectors of a radiation pattern composed of a plurality of predefined narrow beams associated with substantially co-located sources and each providing a discrete signal suitable for input into a CDMA communication device having a plurality of inputs, wherein ones of said plurality of inputs are associated with a particular sector of said plurality of sectors of said radiation pattern, said apparatus comprising:
a first signal splitter associated with each said discrete signal operable to split said discrete signals into multiple signals each suitable for simultaneous provision to more than one input of said plurality of inputs of said CDMA communication device; and
a switch matrix associated with each said discrete signal operable to switchably connect ones of said multiple signals to any combination of said plurality of inputs of said communication device.

52. The apparatus of claim 51, wherein a width of ones of said sectors is determined at least in part by a number of said multiple signals associated with different discrete signals switched to a particular said input of said CDMA communication device.

53. The apparatus of claim 52, wherein said width of said ones of said sectors is adjustable to provide sector overlap, said sector overlap resulting from ones of said multiple signals being simultaneously switched to a plurality of inputs of said CDMA communication device associated with different sectors of said plurality of sectors.

54. The apparatus of claim 51, further comprising:
a set of signal manipulators operable to manipulate ones of said multiple signals associated with a particular discrete signal, wherein manipulation of said ones of said multiple signals adjusts an effective length of at least a portion of a sector of said plurality of sectors.

55. The apparatus of claim 54, wherein said manipulation of said ones of said multiple signals includes attenuation of said signals.

56. The apparatus of claim 54, wherein said manipulation of said multiple signal includes amplification of said signals.

57. The apparatus of claim 51, further comprising:
a processor-based controller providing a control signal to said switch matrixes, said control signal operable to cause said switch matrixes to substantially automatically adjust a size of ones said plurality of sectors by switchably connecting select ones of said multiple signals to select ones of said plurality of inputs of said CDMA communication device.

58. The apparatus of claim 57, wherein said processor-based controller provides said control signal as a function of current communication information determined by said apparatus.

59. The apparatus of claim 58, further comprising:
a second signal splitter associated with each said discrete signal operable to split said discrete signals into at least two signals, a first said signal suitable for provision to said first signal splitter, and a second said signal for provision to a receive attribute measurement circuit, wherein said current communication information comprises information provided by said receive attribute measurement circuit.

60. The apparatus of claim 57, wherein said processor-based controller provides said control signal as a function of a signal provided said processor-based controller by a centralized controller operating to control a plurality of communication devices.

61. An apparatus for dynamically adjusting sector size of a plurality of sectors of a radiation pattern composed of a plurality of predefined narrow beams associated with substantially co-located sources and each providing a discrete signal suitable for input into a CDMA communication device having a plurality of inputs, wherein ones of said plurality of inputs are associated with a particular sector of said plurality of sectors of said radiation pattern, said apparatus comprising:
a first signal splitter associated with each said discrete signal operable to split said discrete signals into multiple signals each suitable for simultaneous provision to more than one input of said plurality of inputs of said CDMA communication device;
a set of attenuators associated with each said discrete signal operable to attenuate ones of said multiple signals associated with said discrete signal, wherein low order attenuation of ones of said multiple signals provides communication of said multiple signal to a particular input of said plurality of inputs and high order attenuation of said multiple signals substantially interrupts communication of said multiple signal to said particular input; and a signal combiner associated with each input of said plurality of inputs of said CDMA communication device operable to combine ones of said multiple signals provided to a same input of said plurality of inputs into a composite signal for input into said communication device, wherein a width of each sector of said plurality of sectors is at least in part defined as a function of said multiple signals provided said inputs associated with each said sector.

62. The apparatus of claim 61, wherein said width of said ones of said sectors is adjustable to provide sector overlap, said sector overlap being a function of ones of said multiple signals being simultaneously provided to a plurality of inputs of said CDMA communication device associated with different sectors of said plurality of sectors.

63. The apparatus of claim 61, wherein attenuation of said ones of said multiple signals adjusts an effective length of at least a portion of a sector of said plurality of sectors.

64. The apparatus of claim 61, further comprising:

a processor-based system controlling said attenuator sets to cause said attenuator sets to substantially automatically adjust ones said plurality of sectors to a predetermined size.

65. The apparatus of claim 64, wherein said processor-based system controls said attenuator sets as a function of communication information determined by said apparatus.

66. The apparatus of claim 65, further comprising:

a second signal splitter associated with each said discrete signal operable to split said discrete signals into at least two signals, a first said signal for provision to said first signal splitter, a second said signal for provision to a receive attribute measurement circuit, wherein said communication information comprises information at least in part provided by said receive attribute measurement circuit.

67. The apparatus of claim 64, wherein said processor-based system controls said attenuator sets as a function of information from a plurality of communication devices.

* * * * *